United States Patent
Cui et al.

(10) Patent No.: US 11,641,152 B2
(45) Date of Patent: May 2, 2023

(54) VIBRATION MOTOR WITH ELASTIC CONNECTOR SHAFT HOLDING POLE PLATE WITH MAGNETS MOVING IN AT LEAST TWO DIRECTIONS AND COILS ON HOUSING WALLS

(71) Applicant: AAC Technologies Pte. Ltd., Singapore (SG)

(72) Inventors: Zhiyong Cui, Shenzhen (CN); Jie Ma, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 279 days.

(21) Appl. No.: 16/994,643

(22) Filed: Aug. 16, 2020

(65) Prior Publication Data
US 2020/0412225 A1  Dec. 31, 2020

Related U.S. Application Data

(63) Continuation of application No. PCT/CN2019/093953, filed on Jun. 29, 2019.

(51) Int. Cl.
*H02K 33/18* (2006.01)
*H02K 35/02* (2006.01)

(52) U.S. Cl.
CPC ............ *H02K 33/18* (2013.01); *H02K 35/02* (2013.01)

(58) Field of Classification Search
CPC .. H02K 7/1869; H02K 7/1876; H02K 7/1892; H02K 33/00; H02K 33/02; H02K 33/06; H02K 33/10; H02K 33/12; H02K 33/14; H02K 33/16; H02K 33/18; H02K 35/00; H02K 35/04

USPC ........ 310/25, 15, 12.01, 81, 80, 321, 20, 21, 310/28–30, 36–37
See application file for complete search history.

(56) References Cited

U.S. PATENT DOCUMENTS

| | | | | |
|---|---|---|---|---|
| 4,630,943 A | * | 12/1986 | Stahl | F16J 15/43 384/446 |
| 4,874,998 A | * | 10/1989 | Hollis, Jr. | F16C 32/0444 901/29 |
| 5,110,141 A | * | 5/1992 | Dayan | F16C 33/1035 310/90.5 |
| 5,877,569 A | * | 3/1999 | Heinrich | H02K 23/66 335/250 |
| 5,956,204 A | * | 9/1999 | Dunfield | G11B 25/043 210/695 |
| 6,064,129 A | * | 5/2000 | Pompei | B60K 5/1283 310/12.32 |
| 6,163,091 A | * | 12/2000 | Wasson | H02K 41/03 310/12.22 |
| 6,686,824 B1 | * | 2/2004 | Yamamoto | H05K 1/165 29/601 |

(Continued)

*Primary Examiner* — Maged M Almawri
(74) *Attorney, Agent, or Firm* — W&G Law Group

(57) ABSTRACT

The invention provides a vibration motor having a housing assembly, an elastic connector, a pole plate, a plurality of magnets and a plurality of coils. The coils and the magnets are matched to drive the pole plate to move in at least two directions within the housing assembly. The coils are arranged on the outer side of the pole plate and fixed on the housing assembly so as to be suitable for a small-size vibration motor, then limitation of coil sizes is effectively avoided. Arrangement of the coils is facilitated, and process flows of the vibration motor during specific assembly can be optimized.

12 Claims, 5 Drawing Sheets

(56) References Cited

U.S. PATENT DOCUMENTS

| | | | | |
|---|---|---|---|---|
| 6,717,308 B2* | 4/2004 | Chen | F16C 33/107 | 310/90 |
| 6,809,427 B2* | 10/2004 | Cheung | H02K 35/02 | 290/1 R |
| 6,812,598 B2* | 11/2004 | Cheung | H02K 35/02 | 322/3 |
| 6,850,138 B1* | 2/2005 | Sakai | H04R 9/06 | 340/388.5 |
| 8,188,622 B1* | 5/2012 | Waters | H02K 35/04 | 290/1 R |
| 8,624,450 B2* | 1/2014 | Dong | H02K 33/16 | 310/20 |
| 9,130,445 B1* | 9/2015 | Katz | H02K 41/0356 | |
| 9,231,461 B2* | 1/2016 | Kim | H02K 35/04 | |
| 9,576,713 B2* | 2/2017 | Goodman | H01F 7/1638 | |
| 9,692,287 B2* | 6/2017 | Yamamoto | H02K 35/02 | |
| 9,820,052 B2* | 11/2017 | Mao | H04R 9/025 | |
| 9,850,733 B2* | 12/2017 | Fripp | E21B 33/12 | |
| 9,942,663 B1* | 4/2018 | Salvatti | H04R 9/025 | |
| 10,128,730 B2* | 11/2018 | Hou | H02K 5/04 | |
| 10,160,010 B2* | 12/2018 | Chun | H02K 33/16 | |
| 10,458,502 B2* | 10/2019 | Sharkh | F16F 7/1011 | |
| 10,674,278 B2* | 6/2020 | Zhou | H04R 9/025 | |
| 10,720,823 B1* | 7/2020 | Kim | H02K 1/02 | |
| 11,050,334 B2* | 6/2021 | Mori | H02K 33/18 | |
| 2003/0062660 A1* | 4/2003 | Beard | H02K 15/02 | 264/645 |
| 2004/0251750 A1* | 12/2004 | Cheung | H02K 35/02 | 310/23 |
| 2005/0151375 A1* | 7/2005 | Cheung | B60C 23/041 | 290/1 R |
| 2005/0247357 A1* | 11/2005 | Welle | B01L 3/502738 | 137/828 |
| 2007/0052302 A1* | 3/2007 | Cheung | B82Y 25/00 | 310/12.25 |
| 2011/0057629 A1* | 3/2011 | Lin | H02K 35/02 | 322/3 |
| 2011/0133577 A1* | 6/2011 | Lee | H02K 33/18 | 310/15 |
| 2011/0140458 A1* | 6/2011 | Arnold | H02K 35/04 | 290/1 R |
| 2011/0140577 A1* | 6/2011 | Galchev | H01L 41/00 | 310/22 |
| 2011/0169347 A1* | 7/2011 | Miyamoto | G06F 3/016 | 310/12.21 |
| 2012/0049660 A1* | 3/2012 | Park | B06B 1/045 | 310/25 |
| 2012/0086213 A1* | 4/2012 | Chan | H02K 7/088 | 310/90 |
| 2012/0153748 A1* | 6/2012 | Wauke | H02K 33/16 | 310/25 |
| 2012/0211990 A1* | 8/2012 | Davey | F03B 15/00 | 290/54 |
| 2013/0010999 A1* | 1/2013 | Lastrucci | H02K 33/16 | 381/400 |
| 2013/0334903 A1* | 12/2013 | Kim | H02K 35/02 | 310/28 |
| 2015/0302987 A1* | 10/2015 | Sano | H01F 41/04 | 29/602.1 |
| 2017/0033653 A1* | 2/2017 | Wang | H02K 33/16 | |
| 2017/0084376 A1* | 3/2017 | Kubota | H01F 17/0006 | |
| 2017/0144191 A1* | 5/2017 | Mao | B06B 1/045 | |
| 2018/0166965 A1* | 6/2018 | Mao | H02K 33/16 | |
| 2018/0238411 A1* | 8/2018 | Sharkh | F16F 7/1011 | |
| 2018/0266849 A1* | 9/2018 | Chen | G08B 6/00 | |
| 2018/0358878 A1* | 12/2018 | Liu | H02K 1/34 | |
| 2019/0356210 A1* | 11/2019 | Harrison | H02K 41/03 | |

* cited by examiner

VIBRATION MOTOR WITH ELASTIC CONNECTOR SHAFT HOLDING POLE PLATE WITH MAGNETS MOVING IN AT LEAST TWO DIRECTIONS AND COILS ON HOUSING WALLS

FIELD OF THE PRESENT DISCLOSURE

The invention relates to the technical field of vibration feedback, in particular to a vibration motor which can vibrate in different directions.

DESCRIPTION OF RELATED ART

A single-frequency linear vibration motor is common in the market, it can only realize one-way vibration in an x-axis direction, a y-axis direction or a z-axis direction, and later a dual-frequency vibration motor appears in the market. In the dual-frequency vibration motor of the related art, two directions are driven separately, and coils are placed inside the vibrator, thus, layout of coils on the vibrators is complicated, the structure of the entire dual-frequency vibration motor is complicated, and due to limitation of coil sizes, the size of an existing dual-frequency vibration motor is generally large. In addition, the dual-frequency vibration motor in the prior art has two resonance frequencies.

Therefore, it is necessary to provide a vibration motor to solve the problems of the complex structure and the large size of the existing dual-frequency vibration motor.

SUMMARY OF THE INVENTION

One of the major objects of the invention is to provide a vibration motor with simplified structure and small form factor.

Accordingly, the present invention provides a vibration motor having a housing assembly; an elastic connector; a pole plate installed in the housing assembly through the elastic connector; a plurality of magnets installed on an outer wall of the pole plate for forming a distance between two adjacent magnets; and a plurality of coils installed on an inner wall of the housing assembly. Each of the coils is opposite from an outer side of a corresponding magnet for cooperatively driving the pole plate to move in at least two directions within the housing assembly.

Further, an even number of the magnets are provided; two of the magnets as one group are symmetrically arranged on two opposite sides of the pole plate; an amount of the coils is equal to an amount of the magnets; and each of the coils oppositely corresponds to one magnet.

Further, the vibration motor includes four magnets; wherein the outer wall of the pole plate has two first side surfaces oppositely arranged and two opposite second side surfaces perpendicular to the first side surfaces; the two magnets are respectively installed one by one on the two first side surfaces; and the other two magnets are respectively installed one by one on the two second side surface.

Further, the outer wall of the pole plate is a quadrangle, and both ends of the two second side surfaces are respectively connected with the two first side surfaces.

Further, the vibration motor includes six magnets; wherein the outer wall of the pole plate has two third side surfaces oppositely arranged; two fourth side surfaces are oppositely arranged; two fifth side surfaces are oppositely arranged; the two magnets are respectively installed one by one on the two third side surfaces; the other two magnets are respectively installed one by one on the two fourth side surfaces; and the remaining two magnets are respectively installed one by one on the two fifth side surfaces.

Further, the outer wall of the pole plate takes a regular dodecagonal shape or a regular hexagonal shape.

Further, the vibration motor comprises a magnetic frame, wherein the coil is installed on an inner wall on the housing assembly through the magnetic frame.

Further, the vibration motor comprises a plurality of iron cores installed on the magnetic frame and respectively arranged in the coils.

Further, the magnetic frame comprises a plurality of frames connected end to end in turn to form an annular component, and each frame is equipped with one coil and one iron core.

Further, the elastic connector is a flexible shaft.

Further, the housing assembly comprises a housing with a concave cavity and a cover plate which covers and is installed at the cavity opening of the concave cavity, one end of the elastic connector is connected with the cover plate and the other end is connected with the pole plate, and the coils are installed spaced from each other on the inner wall of the housing.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
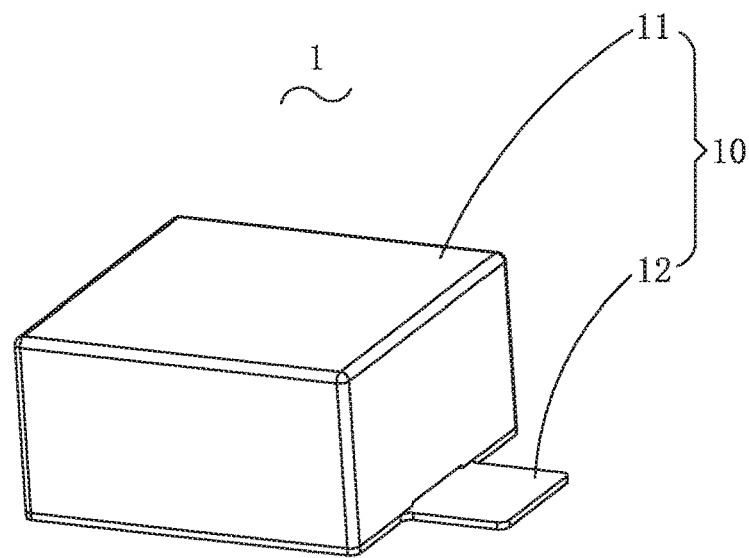
FIG. 1 is an isometric view of a vibration motor provided by a first embodiment of the invention.

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

What needs to be explained is that all directional indications (Such as upper, lower, inner, outer, top, bottom . . . ) in the embodiment of the invention are only used to explain the relative positional relationship between various components under a certain posture (as shown in the drawings), etc. If the specific posture changes, the directional indication will also change accordingly.

It should also be noted that when an element is referred to as being "fixed" or "disposed" on another element, the element may be directly on the other element or there may be intervening elements at the same time. When an element is called "connected" to another element, it may be directly connected to the other element or there may be intervening elements at the same time.

First Embodiment

Referring to FIGS. 1-7, a first embodiment of the invention provides a vibration motor 1. The vibration motor 1 comprises a housing assembly 10, an elastic connector 20, a pole plate 30, a magnetic frame 40, a plurality of magnets 50, a plurality of coils 60 and a plurality of iron cores 70, wherein the magnetic frame 40 in the embodiment is installed on the inner wall of the housing assembly 10; the pole plate 30 is installed in the housing assembly 10 through the elastic connector 20; the magnets 50 are installed at intervals on the outer wall of the pole plate 30; and the coils 60 are installed at intervals on the inner wall of the magnetic frame 40 and are respectively oppositely arranged one by one on the outer sides of the magnets 50. As described in the invention, a mode that the coils 60 are externally arranged is adopted, that is, the coils 60 are arranged on the outer sides of the pole plates 30, so that the coils 60 are suitable for a small-size vibration motor 1. The coils 60 are fixed on the housing assembly 10, the limitation of the sizes of the coils 60 is effectively avoided, and the coils 60 are convenient to wire, so that the technological process of the vibration motor 1 during specific assembly is optimized. The plurality of the iron cores 70 are installed on the magnetic frame 40 and are respectively arranged one by one in the coils 60.

After being electrified, the coils 60 firstly magnetize the iron cores 70 inside the coils to enhance the magnetic permeability effect of the coils 60, and the magnetic frame 40 also improves the magnetic permeability effect of the magnets 50. Therefore, under the cooperation of the coils 60 and the magnets 50, the pole plate 30 can be driven to move in at least two directions within the housing assembly 10, thus realizing vibration of the vibration motor 1 in multiple directions.

Of course, in the embodiment, the coils 60 may be directly installed at intervals on the inner wall of the housing assembly 10 and are respectively oppositely arranged at intervals one by one on the outer sides of the magnets 50, that is, the magnetic frame 40 and/or the iron cores 70 are omitted. Thus, the coils 60 in combination with the magnets 50 can also drive the pole plate 30 to move in at least two directions within the housing assembly 10, only that the magnetic strength of the coils 60 will be weakened.

Preferably, an even number of the magnets 50 are provided; two of the magnets 50 as one group are symmetrically arranged on the two opposite sides of the pole plate 30. The number of the coils 60 is the same as the number of the magnets 50. The coils 60 and the magnets 50 are respectively oppositely arranged at intervals one by one, so as to form two mutual acting forces on the two opposite sides of the pole plate 30, that is, attractive force is formed on one side and repulsive force is formed on the other side to push the pole plate 30 and the magnets 50 to move in the direction of one side.

Figure 2:
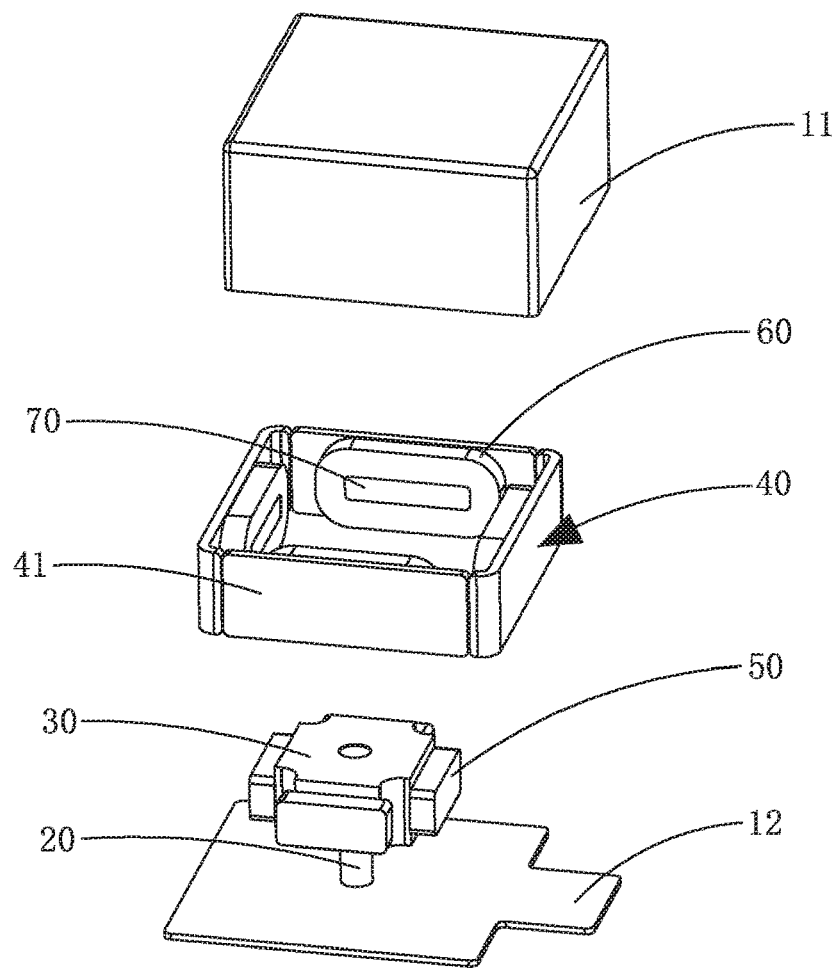
FIG. 2 is an exploded view of the vibration motor in FIG. 1.
Figure 6:
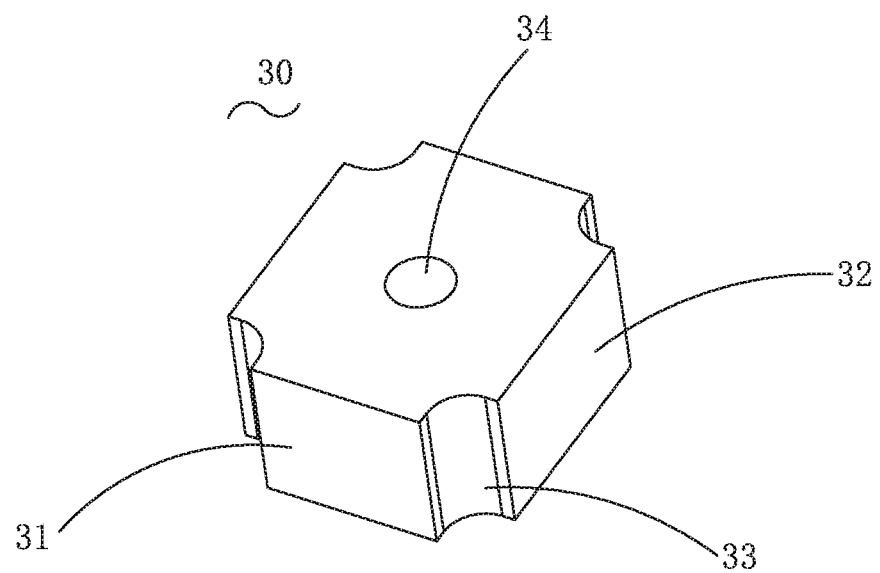
FIG. 6 is a isometric view of a pole plate of the vibration motor.

Referring to FIG. 2 and FIG. 6, specifically, four magnets 50 are provided. The outer wall of pole plate 30 has two first side surfaces 31 and two second side surfaces 32 which are oppositely arranged at intervals; the second side surfaces 32 are connected with the first side surfaces 31 perpendicularly; the two magnets 50 are respectively mounted one by one on the two first side surfaces 31; the other two magnets 50 are respectively mounted one by one on the two second side surfaces 32, so as to realize distribution arrangement of the four magnets 50 on the pole plate 30.

Preferably, the outer wall of the pole plate 30 is preferably a positive quadrilateral, two ends of the two second side surfaces 32 are respectively connected with the two first side surfaces 31, and at the same time, since the pole plate 30 is made of a magnetically conductive material, two adjacent magnets 50 are easy to form a magnetic circuit, which leads to performance reduction of the two magnets 50. In order to avoid reduction of the magnetic performance of the magnets 50, a gap 33 is provided at the junction of the first side surfaces 31 and the second side surfaces 32 in the embodiment. Of course, the gap 33 may be replaced by other structures, such as inclined planes.

In the invention, the magnetic frame 40 comprises a plurality of frames 41, the frames 41 are sequentially connected end to end to form an annular member. Each frame 41 is provided with one coil 60 and one iron core 70, and the magnetic frame 40 can also be integrally formed.

Figure 4:
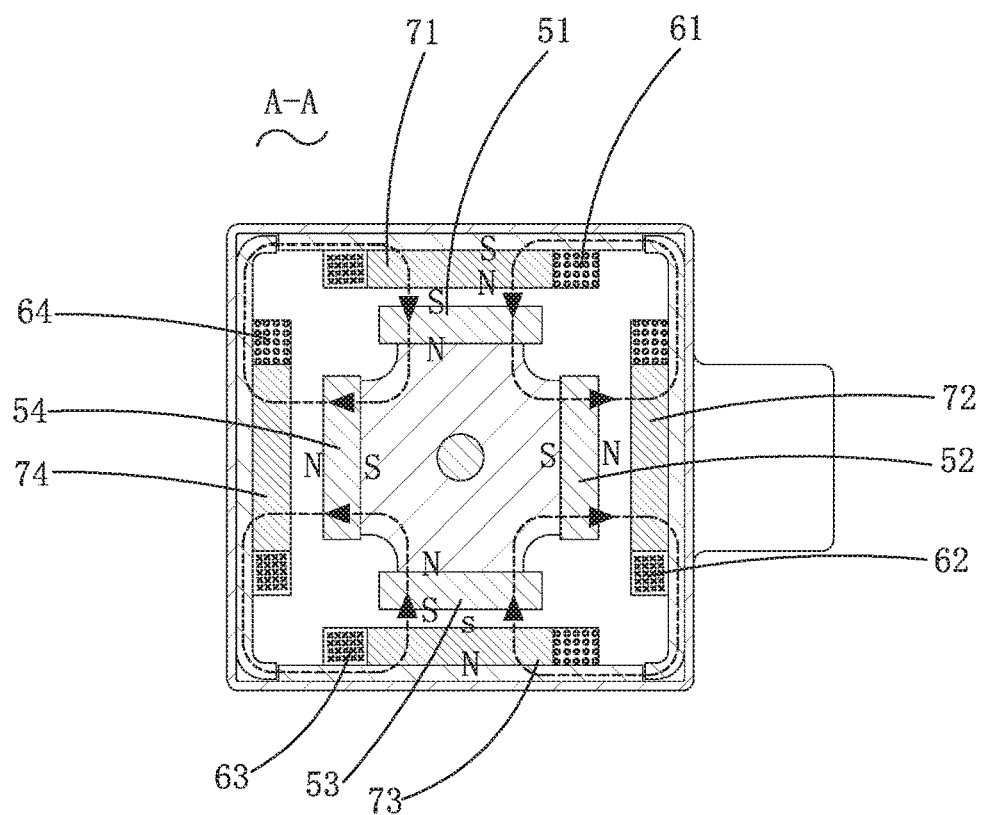
FIG. 4 is a cross-sectional view of the vibration motor taken along line A-A in FIG. 3.

Referring to FIG. 4, in the invention, one magnetic frame 40, one coil 60, one iron core 70 and one magnet 50 can form a small magnetic circuit, therefore, four small magnetic circuits in the invention are uniformly arranged around the pole plate 30. In each small magnetic circuit, the magnetic frame 40 is fixed on the housing 11, the iron cores 70 and the coils 60 are fixed on the magnet frame 40, the magnets 50 and pole plate 30 are part of a vibrator, a certain vibration gap is reserved between the magnets 50 and the iron cores 70, after power is applied, the vibrator will vibrate, thus driving the housing assembly 10, the magnet frame 40 and the coils 60 to vibrate together. Dashed lines in FIG. 4 indicate directions of magnetic field lines.

Referring to FIG. 2, the elastic connector 20 in the invention is a flexible shaft. The elastic connector 20 can be made of elastic materials such as plastic and rubber. When the coils 60 are connected with current, the coils 60 can be matched with the magnets 50 to drive the pole plate 30 to enable the vibration motor 1 to vibrate in a same frequency in different directions with the elastic connector 20 as a rotation point.

Figure 7:
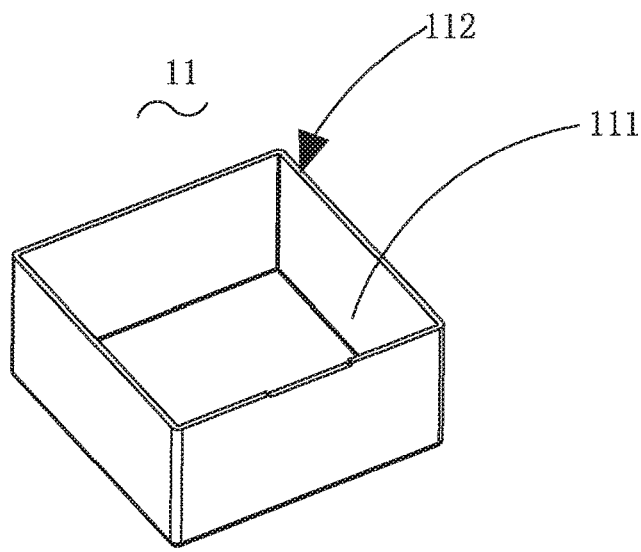
FIG. 7 is a isometric view of a housing of the vibration motor.

With further reference to FIGS. 1 and 7, the housing assembly 10 comprises the housing 11 with a concave cavity 111 and a cover plate 12 installed at the cavity opening 112 of the concave cavity 111. One end of the elastic connector 20 is connected with the cover plate 12, and the other end of the elastic connector 20 is connected with the pole plate 30. Specifically, the pole plate 30 is provided with a mounting hole 34. The other end of the elastic connector 20 is clamped in the mounting hole 34, and the coils 60 are installed at intervals on the inner wall of the housing 11. Under the action of driving force, the vibrator is enabled to swing on the flexible shaft, thus realizing vibration in different directions.

Figure 3:
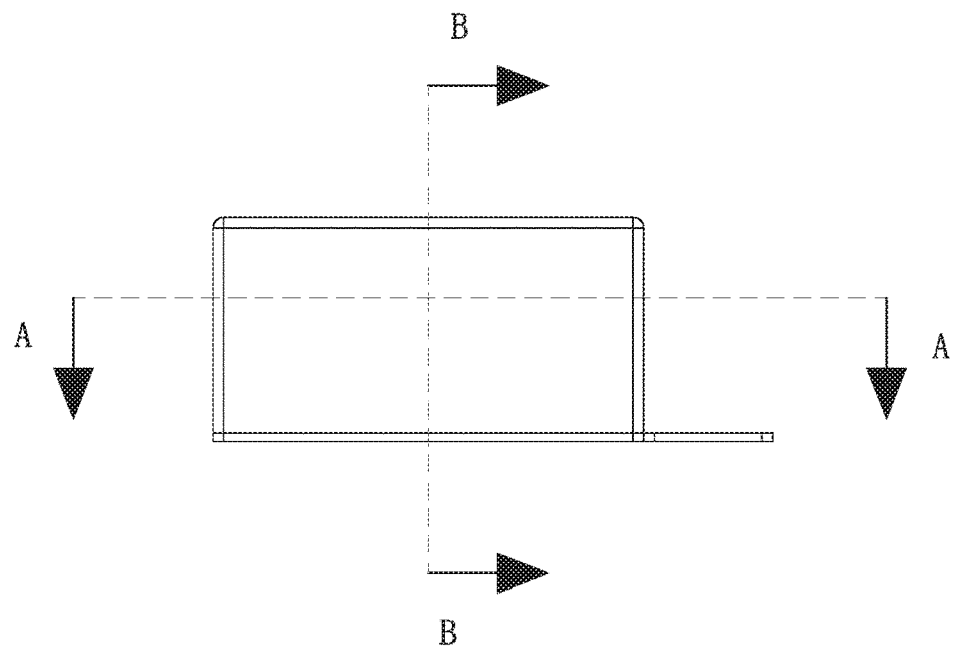
FIG. 3 is a side view of the vibration motor in FIG. 1.
Figure 5:
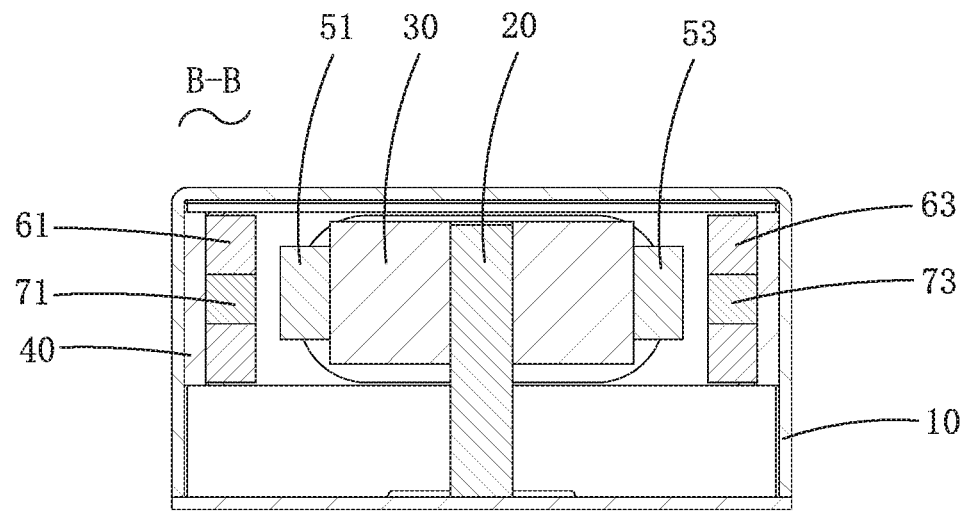
FIG. 5 is a cross-sectional view of the vibration motor taken along line B-B in FIG. 3.

Please refer to FIGS. 3 to 5, arrangement forms and magnetic pole directions of the magnets 50 are shown in FIG. 5. FIG. 5 can also be referred to as a schematic diagram of working principles of the vibration motor 1, which defines the four magnets 50 in FIG. 5 as a first magnet 51, a second magnet 52, a third magnet 53 and a fourth magnet 54, respectively. The coils 60 matched with the magnets 50 are respectively a first coil 61, a second coil 62, a third coil 63 and a fourth coil 64. The iron cores 70 located in the coil 60 are a first iron core 71, a second iron core 72, a third iron core 73 and a fourth iron core 74, respectively. The first magnet 51 and the third magnet 53 are in a group and are arranged oppositely, and the second magnet 52 and the fourth magnet 54 are in a group and are arranged oppositely.

When the first coil 61 is electrified, the first iron core 71 is magnetized, and the force between the first iron core 71 and the first magnet 51 is utilized to drive the vibrator to move. Similarly, the coils 60 of other small magnetic circuits interact with corresponding magnets 50 after being electrified.

The opposite two coils 60 in the magnetic circuit are electrified in a same direction, for example, when the current direction of the first coil 61 is shown in FIG. 4, then the magnetization direction of the first iron core 71 is positive S and negative N, and the acting force between the first iron core 71 and the first magnet 51 is attractive force. When the current direction of the third coil 63 is as shown in FIG. 4, then the magnetization direction of the third iron core 73 is also positive S negative N, and the acting force between the third iron core 73 and the third magnet 53 is repulsive force, so the vibrator moves from one side of the third iron core 73 to one side of the first iron core 71. The same situation is applicable to the second coil 62 and the fourth coil 64.

Second Embodiment

Figure 8:
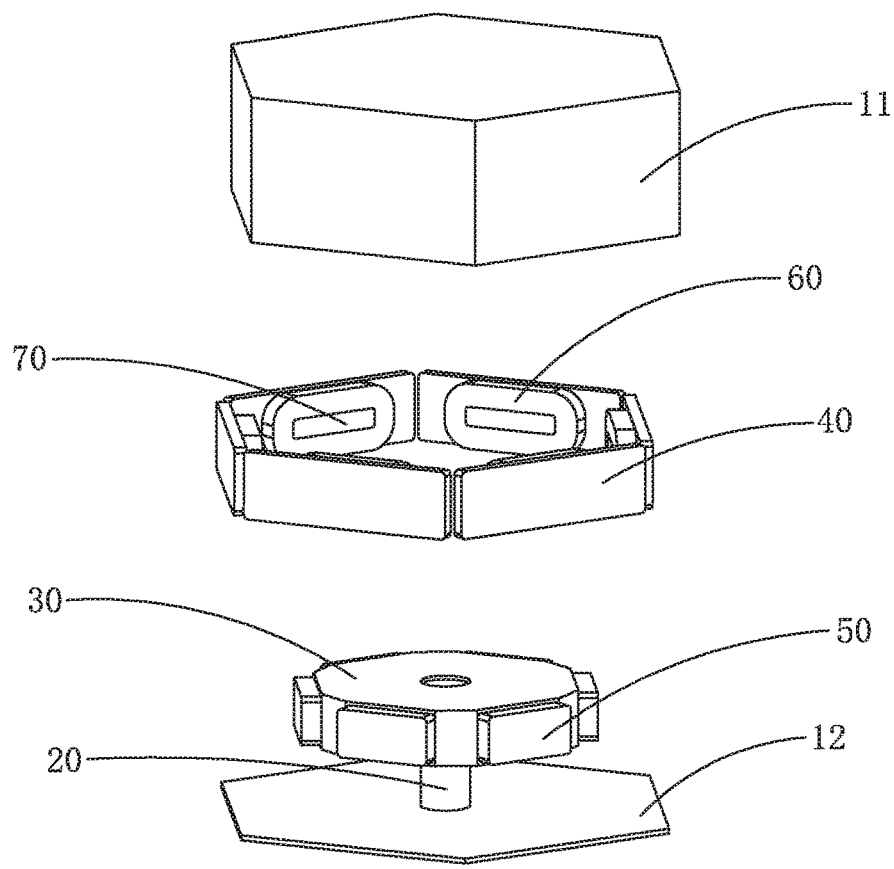
FIG. 8 is an exploded view of a vibration motor provided by a second embodiment of the invention.
Figure 9:
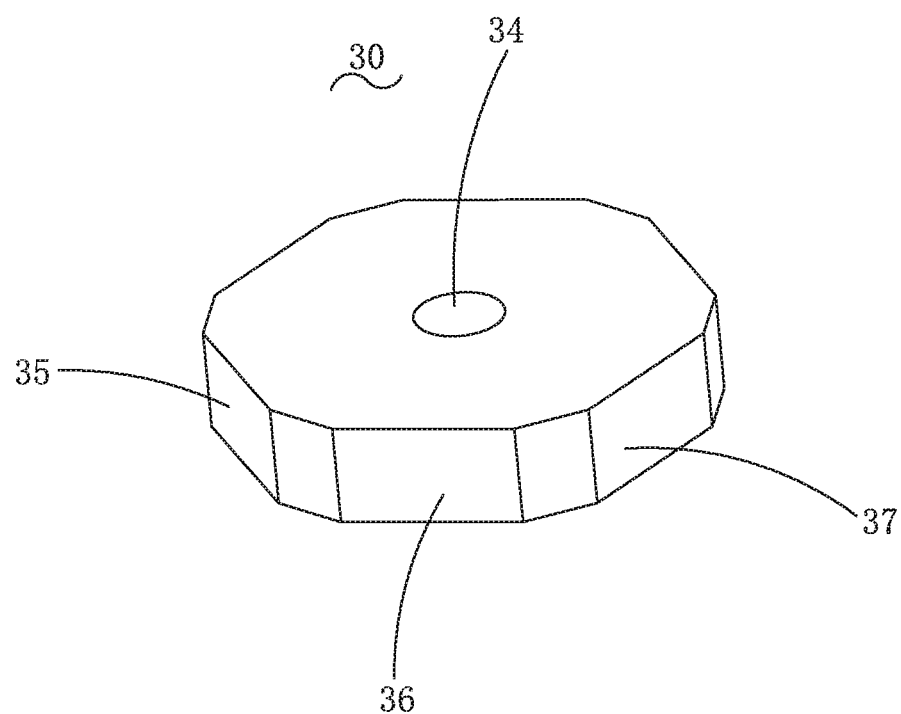
FIG. 9 is an isometric view of a pole plate of the vibration motor in the second embodiment.

Referring to FIGS. 8 to 9, the difference between the vibration motor 1 provided by the second embodiment and the vibration motor 1 provided by the first embodiment lies in the different numbers of the magnets 50 and the coils 60 and the different structures of the pole plate 30 and the magnetic frame 40. Specifically, in the second embodiment, six magnets 50 are provided, and the outer wall of the pole plate 30 is provided with two third side surfaces 35 oppositely arranged at intervals, two fourth side surfaces 36 oppositely arranged at intervals, and two fifth side surfaces 37 oppositely arranged at intervals. Two magnets 50 are respectively installed one by one on two the third side surfaces 35, the other two magnets 50 are respectively installed one by one on the two fourth side surfaces 36. And, the remaining two magnets 50 are respectively installed one by one on the two fifth side surfaces 37, so as to realize installation settings of the plurality of the magnets 50 and the coils 60 in multiple directions. Preferably, the outer wall of the pole plate 30 is in a regular dodecagon or regular hexagon.

As described in the vibration motor 1 provided by the invention, a plurality of magnetic circuit units are axially connected in series, and the magnetic circuits connected in series can provide radial driving force, and with the increase of the magnetic circuits, driving modes of the vibration motor 1 can be diversified, and vibration sensation in different directions can be provided.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:
1. A vibration motor, comprising:
a housing assembly;
an elastic connector;
a pole plate installed in the housing assembly through the elastic connector;
the housing assembly comprises a housing with a concave cavity and a cover plate which covers and is installed at the cavity opening of the concave cavity,
wherein only one elastic connector is provided, one end of the elastic connector is connected with the cover plate and the other end is connected with the pole plate, the central part of the pole plate is provided with a mounting hole, the other end of the elastic connector is clamped in the mounting hole;
a plurality of magnets installed on an outer wall of the pole plate for forming a distance between two adjacent magnets;
a plurality of coils installed on an inner wall of the housing assembly; wherein
each of the coils is opposite from an outer side of a corresponding magnet for cooperatively driving the pole plate to move in at least two directions within the housing assembly;
the vibration motor further comprising a magnetic frame, wherein the coil is installed on an inner wall on the housing assembly through the magnetic frame, the vibration motor further comprising a plurality of iron cores installed on the magnetic frame and respectively arranged in the coils, the magnetic frame comprises a plurality of frames connected end to end in turn to form an annular component, and each frame is equipped with one coil and one iron core.

2. The vibration motor as described claim 1, wherein the elastic connector is a flexible shaft.

3. The vibration motor as described in claim 1, wherein an even number of the magnets are provided; two of the magnets as one group are symmetrically arranged on two opposite sides of the pole plate; an amount of the coils is equal to an amount of the magnets; and each of the coils oppositely corresponds to one magnet.

4. The vibration motor as described in claim 3 further comprising a magnetic frame, wherein the coil is installed on an inner wall on the housing assembly through the magnetic frame.

5. The vibration motor as described in claim 3 including four magnets; wherein the outer wall of the pole plate has two first side surfaces oppositely arranged and two opposite second side surfaces perpendicular to the first side surfaces; the two magnets are respectively installed one by one on the two first side surfaces; and the other two magnets are respectively installed one by one on the two second side surface.

6. The vibration motor as described in claim 5 further comprising a magnetic frame, wherein the coil is installed on an inner wall on the housing assembly through the magnetic frame.

7. The vibration motor as described in claim 5, wherein the outer wall of the pole plate is a quadrangle, and both ends of the two second side surfaces are respectively connected with the two first side surfaces.

8. The vibration motor as described in claim 7 further comprising a magnetic frame, wherein the coil is installed on an inner wall on the housing assembly through the magnetic frame.

9. The vibration motor as described in claim 3 including six magnets; wherein the outer wall of the pole plate has two third side surfaces oppositely arranged; two fourth side surfaces are oppositely arranged; two fifth side surfaces are oppositely arranged; the two magnets are respectively installed one by one on the two third side surfaces; the other two magnets are respectively installed one by one on the two fourth side surfaces; and the remaining two magnets are respectively installed one by one on the two fifth side surfaces.

10. The vibration motor as described in claim 9 further comprising a magnetic frame, wherein the coil is installed on an inner wall on the housing assembly through the magnetic frame.

11. The vibration motor as described in claim 9, wherein the outer wall of the pole plate takes a regular dodecagonal shape or a regular hexagonal shape.

12. The vibration motor as described in claim 11 further comprising a magnetic frame, wherein the coil is installed on an inner wall on the housing assembly through the magnetic frame.

\* \* \* \* \*